US011854572B2

(12) United States Patent
Swift et al.

(10) Patent No.: US 11,854,572 B2
(45) Date of Patent: Dec. 26, 2023

(54) MITIGATING VOICE FREQUENCY LOSS

(71) Applicant: International Business Machines Corporation, Armonk, NY (US)

(72) Inventors: Mary D. Swift, Rochester, NY (US); Irene Lizeth Manotas Gutiérrez, White Plains, NY (US); Kelley Anders, East New Market, MD (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/302,981

(22) Filed: May 18, 2021

(65) Prior Publication Data

US 2022/0375487 A1 Nov. 24, 2022

(51) Int. Cl.
  *G10L 25/18* (2013.01)
  *G10L 19/008* (2013.01)
  (Continued)

(52) U.S. Cl.
  CPC .............. *G10L 25/18* (2013.01); *G10L 15/10* (2013.01); *G10L 15/14* (2013.01); *G10L 19/008* (2013.01); *G10L 19/0204* (2013.01); *G10L 25/90* (2013.01)

(58) Field of Classification Search
  CPC ... G10L 15/06; G10L 15/063; G10L 15/0631; G10L 15/065; G10L 15/07; G10L 15/08;
  (Continued)

(56) References Cited

U.S. PATENT DOCUMENTS

| 7,536,731 B1 | 5/2009 | Feldman |
| 8,930,183 B2 | 1/2015 | Chun |

(Continued)

FOREIGN PATENT DOCUMENTS

| IN | 202041049952 A | 11/2020 |
| JP | 2020077933 A * | 5/2020 |
| WO | 2019229519 A1 | 12/2019 |

OTHER PUBLICATIONS

Horea, Tiki, "Eq Curves Defined", Feb. 13, 2020, Sonarworks Blog (Year: 2020).*

(Continued)

*Primary Examiner* — Andrew C Flanders
*Assistant Examiner* — Alexander Joongie Kim
(74) *Attorney, Agent, or Firm* — Edward J. Wixted, III (57) ABSTRACT

Computer-implemented methods, computer program products, and computer systems for mitigating frequency loss may include one or more processors configured for receiving first audio data corresponding to unobstructed user utterances, receiving second audio data corresponding to first obstructed user utterances, generating a frequency loss (FL) model representing frequency loss between the first audio data and the second audio data, receiving third audio data corresponding to one or more second obstructed user utterances, processing the third audio data using the FL model to generate fourth audio data corresponding to a frequency loss mitigated version of the second obstructed user utterances, and transmitting the fourth audio data to a recipient computing device. The first obstructed user utterances are obstructed by a facemask and the one or more second obstructed user utterances is obstructed by the facemask. The FL model may be executed as an audio plugin in a web conferencing program.

20 Claims, 6 Drawing Sheets

(51) Int. Cl.
*G10L 25/90* (2013.01)
*G10L 19/02* (2013.01)
*G10L 15/10* (2006.01)
*G10L 15/14* (2006.01)

(58) Field of Classification Search
CPC ....... G10L 15/10; G10L 15/14; G10L 19/008; G10L 19/02; G10L 19/0204; G10L 25/18; G10L 25/90; G10L 21/02; G10L 21/0316; G10L 21/0324; G10L 21/0332; G10L 21/034; G10L 21/0364
See application file for complete search history.

(56) References Cited

U.S. PATENT DOCUMENTS

| | | | | |
|---|---|---|---|---|
| 9,807,492 | B1* | 10/2017 | Campbell | H04R 1/1083 |
| 10,616,701 | B2 | 4/2020 | Lesso | |
| 11,295,759 | B1* | 4/2022 | Rothenberg | G10L 25/60 |
| 11,551,670 | B1* | 1/2023 | Smith | G10L 15/063 |
| 2014/0216448 | A1* | 8/2014 | Kihlberg | H03G 5/025 |
| | | | | 128/201.19 |
| 2016/0001110 | A1* | 1/2016 | Hamilton | H04R 1/1066 |
| | | | | 381/385 |
| 2017/0246415 | A1 | 8/2017 | Kwok | |
| 2022/0199103 | A1* | 6/2022 | Carter | G10L 21/0364 |
| 2022/0303654 | A1* | 9/2022 | Marzorati | G06N 20/00 |

OTHER PUBLICATIONS

Corey, Ryan, "How do face masks affect speech?", Innovation in Augmented Listening Technology, University of Illinois, Jun. 25, 2020, 5 Pages.
Gerritsen et al., "A source impedance compensated artificial voice for mask speech intelligibility testing: Thevenin model", The Journal of the Acoustical Society of America, 100.5: 3408-3416, Nov. 1996, 10 Pages.
Magee et al., "Effects of Face Masks on Acoustic Analysis and Speech Perception: Implications for Peri-pandemic Protocols", The Journal of the Acoustical Society of America, vol. 148, No. 6, Dec. 2020, 8 Pages.
Noe, Rain, "A Smart Face Mask With Built-In Amplifier, Speech Translator and Bluetooth Connectivity", Core77, Inc., Jun. 26, 2020, 2 Pages.
Nvidia Developer, "Nvidia Maxine", Nvidia Corporation, Accessed on Feb. 17, 2021, 4 Pages.
Pascual et al., "Towards Generalized Speech Enhancement with Generative Adversarial Networks", arXiv:1904.03418v1, [cs.SD], Apr. 6, 2019, 5 Pages.

* cited by examiner

| FREQUENCY (Hz) | BASELINE ATTENUATION (dB) | MASK ATTENUATION (dB) | MASK TYPE | VOICE TYPE |
|---|---|---|---|---|
| 300 | -9 | -10 | SURGICAL | FEMALE |
| 400 | -10 | -11 | SURGICAL | FEMALE |
| 500 | -10 | -14 | SURGICAL | FEMALE |
| 600 | -10 | -12 | SURGICAL | FEMALE |
| 700 | -6 | -12 | SURGICAL | FEMALE |
| 800 | -10 | -12 | SURGICAL | FEMALE |
| 900 | -10 | -12 | SURGICAL | FEMALE |
| 1000 | -10 | -18 | SURGICAL | FEMALE |
| 2000 | -10 | -18 | SURGICAL | FEMALE |
| 3000 | -6 | -18 | SURGICAL | FEMALE |
| 3400 | -8 | -18 | SURGICAL | FEMALE |

MITIGATING VOICE FREQUENCY LOSS

BACKGROUND OF THE INVENTION

The present invention relates generally to the field of audio signal processing, and more particularly to mitigating voice frequency loss due to voice obstructions.

As the world is well into the COVID-19 pandemic, many precautions are being recommended by health organizations and government agencies to reduce the spread of this respiratory virus. One of the precautions recommended is to wear facemasks or face coverings to cover one's mouth and nose to reduce the chance of infection. Facemasks have proven to be a useful technique to mitigate COVID-19 transmission, however depending on the type of mask worn by an individual, it can be difficult to hear what that individual is saying. Additionally, if the individual is speaking to someone with a hearing deficiency, the hearing difficulty challenged is compounded.

Research shows that the type (e.g., surgical, cloth, scarf) of mask worn has a direct impact on the frequencies blocked due to not only the speaker's voice, but also the fabric or compound mesh characteristics (e.g., composition, density). Research also shows that lapel microphone placement can mitigate frequency loss due to facemask obstruction.

As society continues to overcome the challenges of the COVID-19 pandemic and return to in-person work, school, and daily activities, many locations (especially indoor) will mandate facemask use to comply with safety protocols. This transitional phase to the new normal leads to an immediate need in mitigating the frequency losses to facilitate improved communications while wearing masks. Additionally, professionals engaged in sterile working environments also wear personal protective equipment, such as masks or face coverings, that impede clear and effective communication with others. A solution is needed to improve mask-on communications, whether in-person or via virtual meetings or web conferences.

SUMMARY

Embodiments of the present invention disclose a computer-implemented method, a computer program product, and a computer system for mitigating voice frequency loss.

The computer-implemented method for mitigating voice frequency loss may include one or more processors configured for receiving first audio data corresponding to one or more unobstructed user utterances and receiving second audio data corresponding to one or more first obstructed user utterances.

In an embodiment, the one or more first obstructed user utterances may be obstructed by a facemask and the one or more second obstructed user utterances may be obstructed by the facemask.

The computer-implemented method may further include one or more processors configured for generating a frequency loss (FL) model representing frequency loss between the first audio data and the second audio data; receiving third audio data corresponding to one or more second obstructed user utterances; processing the third audio data using the FL model to generate fourth audio data corresponding to a frequency loss mitigated version of the one or more second obstructed user utterances; and transmitting the fourth audio data to a recipient computing device, wherein the recipient device may be a computing device that is associated with an intended recipient of third audio data.

In an embodiment, the first audio data and the second audio data may be captured via a microphone of a computing device. In an embodiment, the computing device may be a wearable device configured to process and reproduce the fourth audio data as an audio signal via a speaker of the wearable device.

In an embodiment, generating the FL model may further include one or more processors configured for converting the first audio data and the second audio data to frequency domains; determining frequency deltas for one or more of a range of frequencies in the frequency domains; determining attenuation values for one or more of the range of frequencies for the first audio data and the second audio data; and mapping the frequency deltas and the attenuation values in the frequency domains for the first audio data and the second audio data in a matrix representing the FL model.

In an embodiment, the computer-implemented method may further include generating a graphical display of the FL model on a user interface of a computing device, wherein the graphical display comprises visualizations of time domain images and frequency domain images of one or more of the first audio data, second audio data, attenuation values, and frequency deltas.

In an embodiment, the FL model may be executed as an audio plugin in a web conferencing program.

DETAILED DESCRIPTION

To improve voice communications between users wearing masks, embodiments described herein boost lost frequencies that would have been present but for mask use. Different masks affect voice frequency loss in different ways based on the type of mask worn. Nonetheless, in order to boost lost frequencies, various steps may be performed.

In an embodiment, an analysis of a user's voice with and without a particular type of mask can be conducted. This voice analysis phase is similar to a calibration phase, wherein voice frequencies with a mask may be correlated to the voice frequencies without the same mask to determine how the mask affects the voice frequencies. The user's voice may be analyzed using a spectrum analyzer to receive unobstructed voice data (e.g., without a mask worn) and obstructed voice data (e.g., with a mask worn) to generate a spectrum analysis illustrating how the voice frequencies are affected while obstructed.

In an embodiment, data generated from the voice analysis phase may be used to derive or generate a mask frequency loss (FL) model corresponding to the nature in which the voice frequencies are affected by the mask at different frequencies. The mask FL model may be used with audio processing techniques to perform frequency shaping to generate enhanced frequencies, if required. For example, the delta at each frequency range may be determined to infer that the range of frequencies may need to be reshaped to boost the lost frequencies. The mask FL model is representative of a matrix of frequencies with attenuation represented as a change in decibels. The matrix of frequencies and decibel loss may be saved to a template or data chart that can be processed by a graphic equalizer. Processing the matrix of frequencies using a graphic equalizer may allow a comparison between the enhanced audio signals and the base reference audio signals to determine audio reconstruction precision. The enhanced frequencies may be embodied as an audio plugin within web-conferencing software programs.

Embodiments of the present invention recognize that each user has a unique voice, resulting in different voice frequency signatures. Thus, each user's voice may be processed to perform the calibration or voice analysis phase with and without a mask. Further, since masks have different material compositions, each type of mask the user anticipates will be worn while communicating should be used during the calibration phase. Embodiments of this invention may be implemented in a wearable device having a microphone and/or a speaker. Further, data transactions generated from implemented embodiments of this invention may be tracked over time and stored in a database for further processing and analysis, and to provide visualizations and trending reports. Further, enhanced frequencies may be embodied and/or sent to a wearable device for processing and reproduction. Even further, a generalized mask FL model can be derived based on a small data sample for out of the box use. Implementation of embodiments of the invention may take a variety of forms, and exemplary implementation details are discussed subsequently with reference to the Figures.

Figure 1:
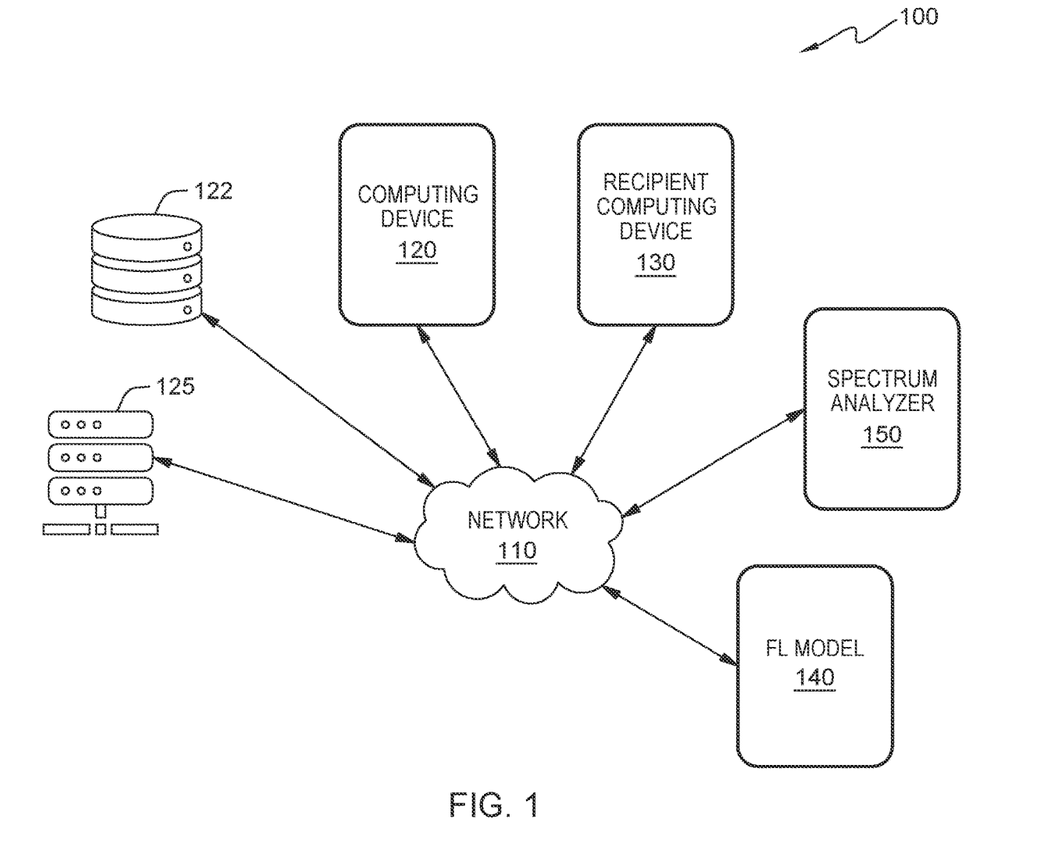
FIG. 1 is a functional block diagram illustrating a distributed data processing environment for mitigating voice frequency loss, in accordance with an embodiment of the present invention.

FIG. 1 is a functional block diagram illustrating a distributed data processing environment 100 for mitigating voice frequency loss, generally designated 100, in accordance with an embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 may include computing device 120, database 122, server 125, recipient computing device 130, frequency loss "FL" model 140, and spectrum analyzer 150 interconnected via network 110. Distributed data processing environment 100 may include database 122 configured to store data received from, and transmit data to, components (e.g., computing device 120, recipient computing device 130, FL model 140, and spectrum analyzer 150) within distributed data processing environment 100 for mitigating voice frequency loss. Distributed data processing environment 100 may also include additional servers, computers, sensors, or other devices not shown. Each component (e.g., computing device 120, recipient computing device 130, FL model 140, and spectrum analyzer 150) may be configured to communicate data among each other independent of network 110.

Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, recipient computing device 130, FL model 140, and spectrum analyzer 150.

Computing device 120 is configured to operate as a user device for facilitating user functions available via equipped hardware and software. Recipient computing device 130 is virtually identical to computing device 120, except that it may be configured to receive communication data (e.g., enhanced voice data) from computing device 120 during implementation of the embodiments described herein. For example, recipient computing device may be a computing device associated with an intended recipient of third audio data. In an embodiment, computing device 120 may be configured to receive or detect voice data from a microphone (not shown), process the voice data, or transmit the voice data to another device within environment 100 for further processing. Computing device 120 and recipient computing device 130 may be configured to send and/or receive data from network 110 or via other system components within distributed data processing environment 100. In some embodiments, computing device 120 and recipient computing device 130 may be a laptop computer, tablet computer, netbook computer, personal computer (PC), a desktop computer, a smart phone, smart speaker, virtual assistant, voice command device or any programmable electronic device capable of receiving or detecting voice signals, processing the voice signals, and facilitating voice data communications between components within environment 100. Computing device 120 and recipient computing device 120 may include components as described in further detail in FIG. 6.

Database 122 may be configured to operate as a repository for data flowing to and from network 110 and other connected components. Examples of data include voice data, audio data, device data, network data, data corresponding to user utterances processed by the vocoder, coding parameters, vocoder parameters, data corresponding to enhanced voice frequencies, and data corresponding to mitigating voice frequency loss. A database is an organized collection of data. Database 122 can be implemented with any type of storage device capable of storing data and configuration files that can be accessed and utilized by server 125 and/or computing device 120, such as a database server, a hard disk drive, or a flash memory. In an embodiment, database 122 may be accessed by computing device 120, server 125, recipient computing device 130, FL model 140, and spectrum analyzer 150, via network 110 or independent of network 110, to store and receive data corresponding to mitigating voice frequency loss. For example, audio data may be received and stored in database 122 and transmitted to FL model 140 or other components connected to network 110 as desired. In another embodiment, database 122 may be accessed by server 125, FL model 140, and/or spectrum analyzer 150 to access audio data, frequency data, device data, network data or other data associated with mitigating voice frequency loss. In another embodiment, database 122 may reside elsewhere within distributed network environment 100 provided database 122 have access to network 110. The audio data may be representative of a user utterance that includes voice characteristics based on user characteristics that uniquely distinguish one user's voice from another user's voice. For instance, the voice characteristics may include pitch, speech rate, tone, texture, intonation, loudness, etc., wherein the combination of one or more of the voice characteristics may result in a unique voice corresponding to an accent or a dialect.

Server 125 can be a standalone computing device, a management server, a web server, or any other electronic device or computing system capable of receiving, sending, and processing data and capable of communicating with computing device 120 via network 110. In an embodiment, server 125 may be configured to host FL model 140, execute FL model 140, and perform at least a portion of the processing/analysis steps of computer-implemented method of embodiments described herein in environment 100. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 6.

In an embodiment, FL model 140 may include a Mask Frequency Loss (FL) Model configured to receive audio data (e.g., unobstructed voice data, obstructed voice data), process (e.g., perform spectral analysis) the audio data, and generate a loss model chart of the audio data to illustrate a frequency response difference between an unobstructed user voice and an obstructed user voice, wherein the obstruction is due to a facemask covering the user's mouth. An initial phase of FL model 140 may include performing a spectral analysis on the received audio data to determine the delta at each frequency range to infer the range of frequencies that may be reshaped to mitigate the losses due to the mask obstruction. In an embodiment, the spectral analysis may be performed by graphic equalizer 150 or an equivalent vocoder configured to process audio signals or audio data to analyze audio characteristics of the audio data.

Further, an intermediate phase of FL model 140 may include determining a frequency differencing analysis on the audio data, wherein the frequency differencing analysis may be represented as a graph or histogram (e.g., dB loss on the Y axis, frequency over time on the X axis) including the unobstructed voice data and the obstructed voice data. Further, FL model 140 may be configured to generate model output data corresponding to a matrix that contains a set of features that can be used to determine the adjustments to voice using graphic equalizer 150.

Graphic equalizer 150 may be a voice codec or voice processor configured to analyze and synthesize an input human voice signal for audio data compression, multiplexing, voice encryption, or voice transformation. Graphic equalizer 150 may include several filter bands tuned across the audio spectrum. Graphic equalizer 150 may be configured to generate voice textures using equalizer parameters. Equalizer parameters are a type of coding parameters used to program graphic equalizer 150 to manipulate audio signals received according to the number of units that are measurable for the equalizer parameters. Graphic equalizer 150 may be configured to receive audio data, process the audio data in a frequency domain, and generate model output data corresponding to a matrix that contains a set of features that can be used to determine the adjustments to voice input data using graphic equalizer 150.

Graphic equalizer 150 may also be configured to generate multiple variations of voices or user utterances based on the equalizer parameters and values provided in the audio data. A received user utterance may be modulated or modified by applying the equalizer parameters. For example, known audio signal processing techniques may be used to attenuate the user utterances in the audio data so that the attenuated or enhanced user utterances sound similar to the received user utterance.

Figure 2:
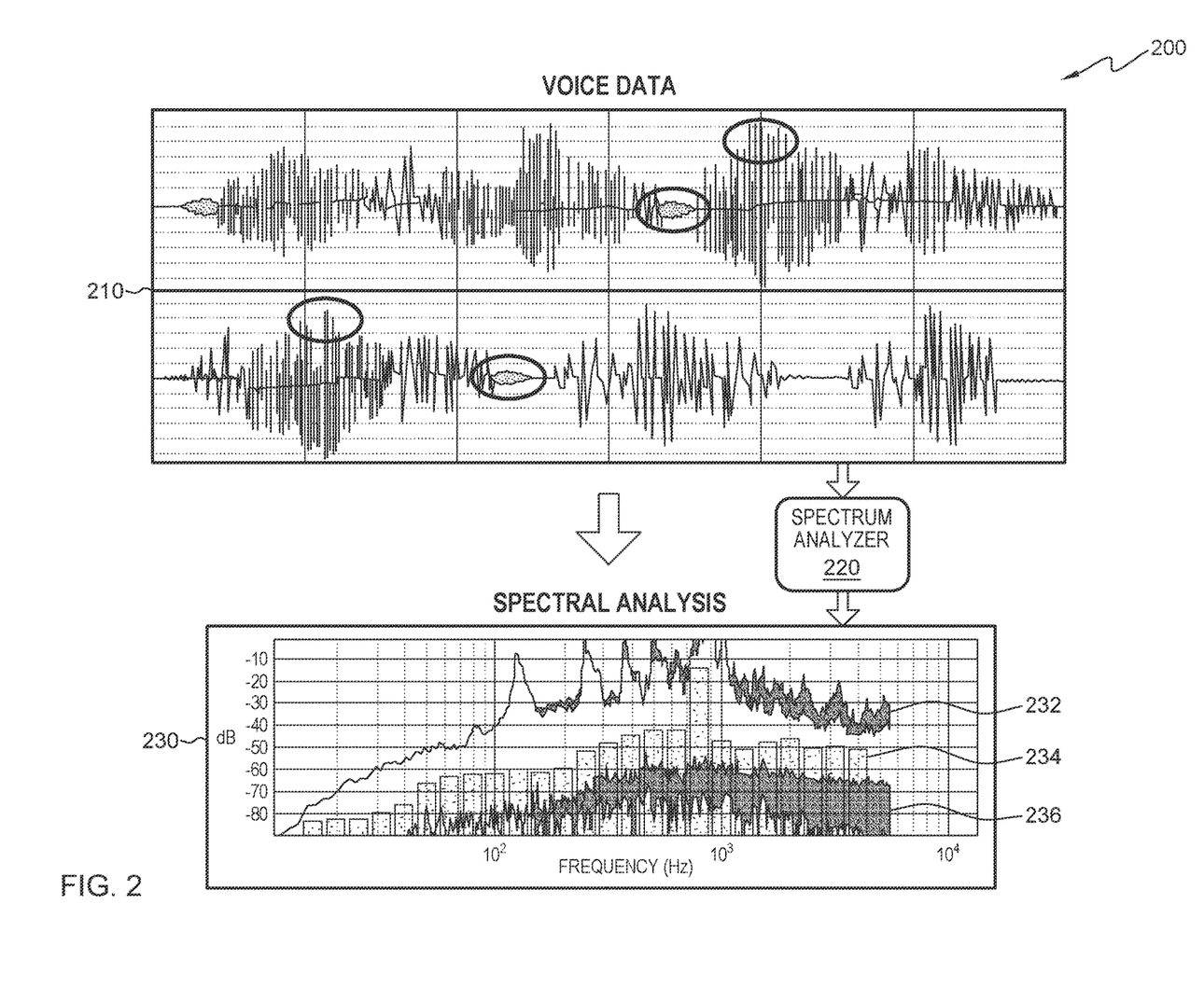
FIG. 2 is a block diagram illustrating a calibration phase for mitigating voice frequency loss, in accordance with an embodiment of the present invention.

FIG. 2 is a block diagram illustrating a calibration phase 200 for mitigating voice frequency loss, in accordance with an embodiment of the present invention.

In an embodiment, calibration phase 200 may include one or more processors configured for receiving voice data 210 at spectrum analyzer 220 and performing a spectral analysis on voice data 210 to generate frequency loss graph 230. For example, voice data 210 received at spectrum analyzer 220 may be displayed as wave patterns on a frequency and time scale, wherein voice characteristics (e.g., peaks, troughs, amplitudes, frequency) may be observed and correlated to a time frame. In a first instance, voice data 210 corresponding to an unobstructed voice utterance may be captured via a microphone of a computing device and associated with an unobstructed benchmark data set. Voice data 210 wave patterns may be displayed on a user interface display to illustrate features (e.g., time-frequency variations, amplitude) of the unobstructed voice utterance. In a second instance, voice data 210 corresponding to an obstructed voice utterance may be captured via the microphone of the computing device and associated with an obstructed data set for the obstruction (e.g., facemask, face shield).

In an embodiment, spectrum analyzer 220 may be configured to process voice data 210 corresponding to the unobstructed voice utterance and the obstructed voice utterance and generate frequency loss graph 230 illustrating how many constituent parts of the voice are in each frequency range (e.g., 0 Hz-100 Hz, 100 Hz-1000 Hz), wherein the frequency range may be any range sufficient to identify varying parts of the voice. Frequency loss graph 230 illustrates the frequency distribution for the audio data as amplitude (dB) versus frequency (Hz), wherein the amplitude is along the y-axis and the frequency is along the x-axis. In other words, for a particular frequency range, first audio data 232 is processed and displayed as an unobstructed density distribution 234 (e.g., baseline attenuation (dB)) and an obstructed density distribution 236 (e.g., mask attenuation (dB)) for each frequency range. As shown, the frequency that has the highest density is about 765 Hz, corresponding to a max frequency of about 850 Hz in first audio data 232. The spectral analysis may be performed for any number of paired (e.g., baseline mask off, mask on) voice data samples (e.g., 10, 100, 1000, 10000), wherein the more data samples provided, the more improved the output data will be in making the frequency corrections. Each data sample may be associated with a mask type, a voice type, or other voice dependent characteristics to correlate the frequency differences realized throughout the analysis. Other voice dependent characteristics may include age, gender, or vocal cord modifications due to medical procedures or accidents. Thus, as a user's voice changes over time due to the voice dependent characteristics changing over time, current voice data may be gathered and processed to improve FL model 140 by providing updated voice data 210 to spectrum analyzer 220 to generate a newly updated spectral analysis 230 on the changed or modified voice.

Figure 3:
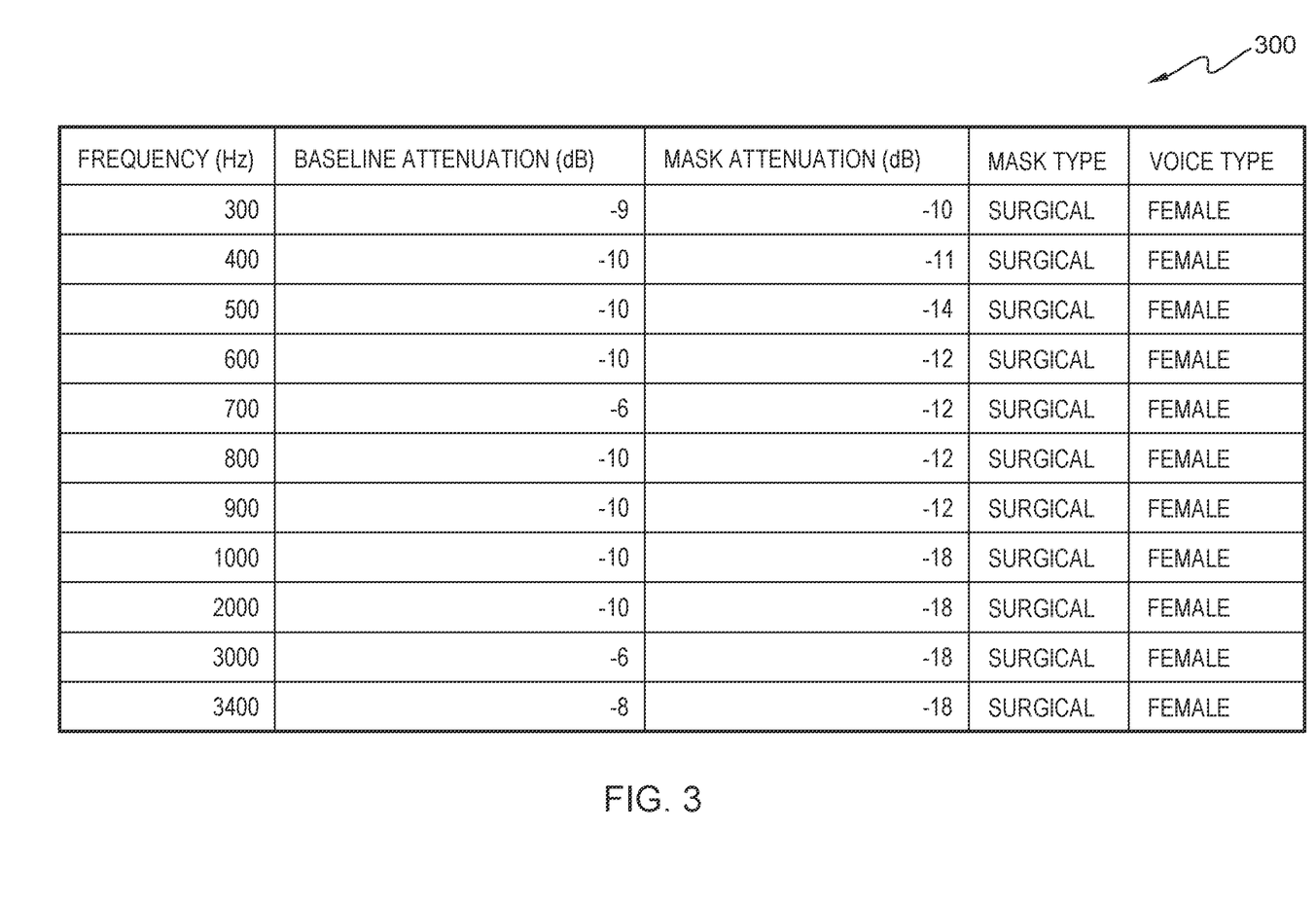
FIG. 3 illustrates a loss model table for mitigating voice frequency loss, in accordance with an embodiment of the present invention.

FIG. 3 illustrates a loss model table 300 for mitigating voice frequency loss, in accordance with an embodiment of the present invention. Responsive to performing the spectral analysis on voice data 210, one or more processors may be configured to gather and store model output data corresponding to the density distributions over the frequency ranges. For example, at 300 Hz, the baseline attenuation is −9 dB for an unobstructed female voice type and the mask attenuation is −10 dB for a particular user utterance, representing a difference of −1 dB loss with the mask on. At 500 Hz, the difference is greater with a −4 dB loss and even greater at 3 kHz with a −12 dB loss. A correlation can be made with this particular data set that there are greater attenuation losses at higher frequencies. However, an important observation is the amount of decibel loss at the particular frequencies that can be used to attenuate depressed user voice frequencies by the decibel loss amount. In an embodiment, loss model table 300 features may further include measurements for a user of a given age, for as a person matures in age, the person's voice changes in accordance with their maturity. Therefore, the stored input voice data or the model output data for the FL model may be tuned or adjusted relative to the person's age, as the person's mean frequency range will change over time.

In an embodiment, output data illustrated in loss model table 300 may be converted to a matrix that contains a set of features that can be used to determine the adjustments to voice data using graphic equalizer 150. The matrix representing loss model table 300 may be employed in FL model 140 to automatically attenuate audio data corresponding to obstructed voice utterances to mitigate voice frequency losses due to the mask's obstruction.

Figure 4:
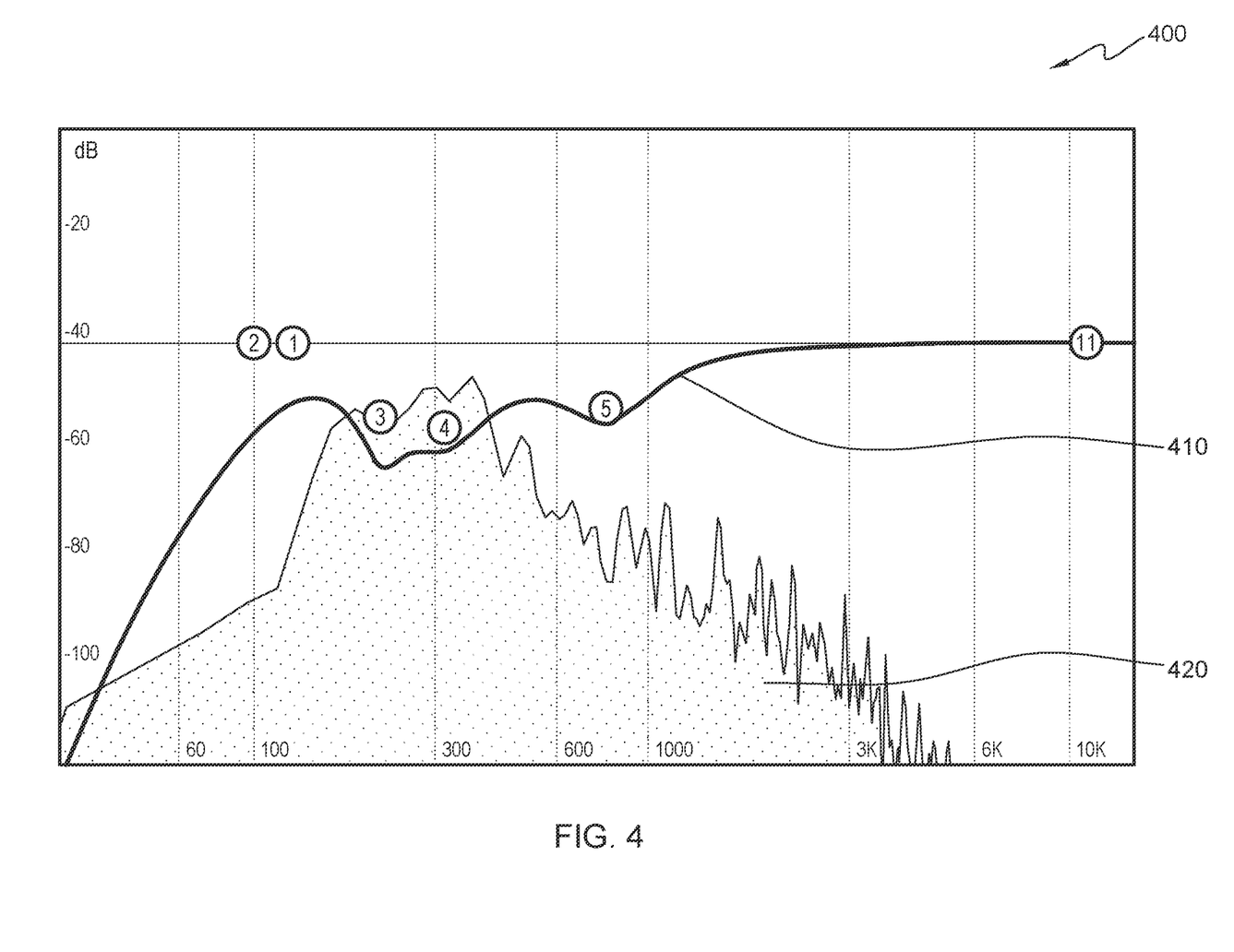
FIG. 4 illustrates a frequency loss mitigation graph for mitigating voice frequency loss, in accordance with an embodiment of the present invention.

FIG. 4 illustrates a frequency loss mitigation graph 400 for mitigating voice frequency loss, in accordance with an embodiment of the present invention. In an embodiment, attenuated audio data may be represented as enhanced audio signal 410 overlayed upon baseline audio signal 420 to perform a comparison between the two signals and to make adjustments accordingly. For example, enhanced audio signal 410 may be adjusted to reflect the baseline frequencies illustrated in baseline audio signal 420. As enhanced audio signal 410 is adjusted, FL model 140 is adjusted accordingly to reflect the improvements in frequency characteristics so that FL model 140 may accurately generate an unobstructed version of the obstructed audio signal corresponding to the obstructed user utterance. In an embodiment, types of adjustments may include, but are not limited to, Bell Shape adjustment, low shelf filter, high shelf filter, low pass cutoff, or high pass cutoff. Indeed, when dealing with high and low frequency cut-offs, frequency shaping (e.g., curved, resonant, negative feedback tone control, bell-shaped equalizer response, Brickwall) adjustments may be applied.

In an embodiment, as FL model 140 is applied to the obstructed voice signal audio data, frequencies may be attenuated or boosted to replace the lost voice frequencies due to mask obstruction and generate enhanced voice signal audio data. As a result of attenuating the frequencies, energy is added to the obstructed voice signals, which also increases the obstructed voice signal amplitude at the particular frequencies. However, even if the frequencies are boosted to mitigate the mask frequency loss at a particular level, the overall character of the enhanced voice signal audio data may not satisfy a similarity threshold to accurately resemble the unobstructed voice signal or user utterance. Therefore, maximization may be applied to the enhanced voice signal to satisfy the similarity threshold. Graphic equalizer 150 may be used to perform the frequency attenuation and maximization techniques on the obstructed voice signal audio data to achieve a similarity threshold and resemble the unobstructed voice signal or user utterance.

Figure 5:
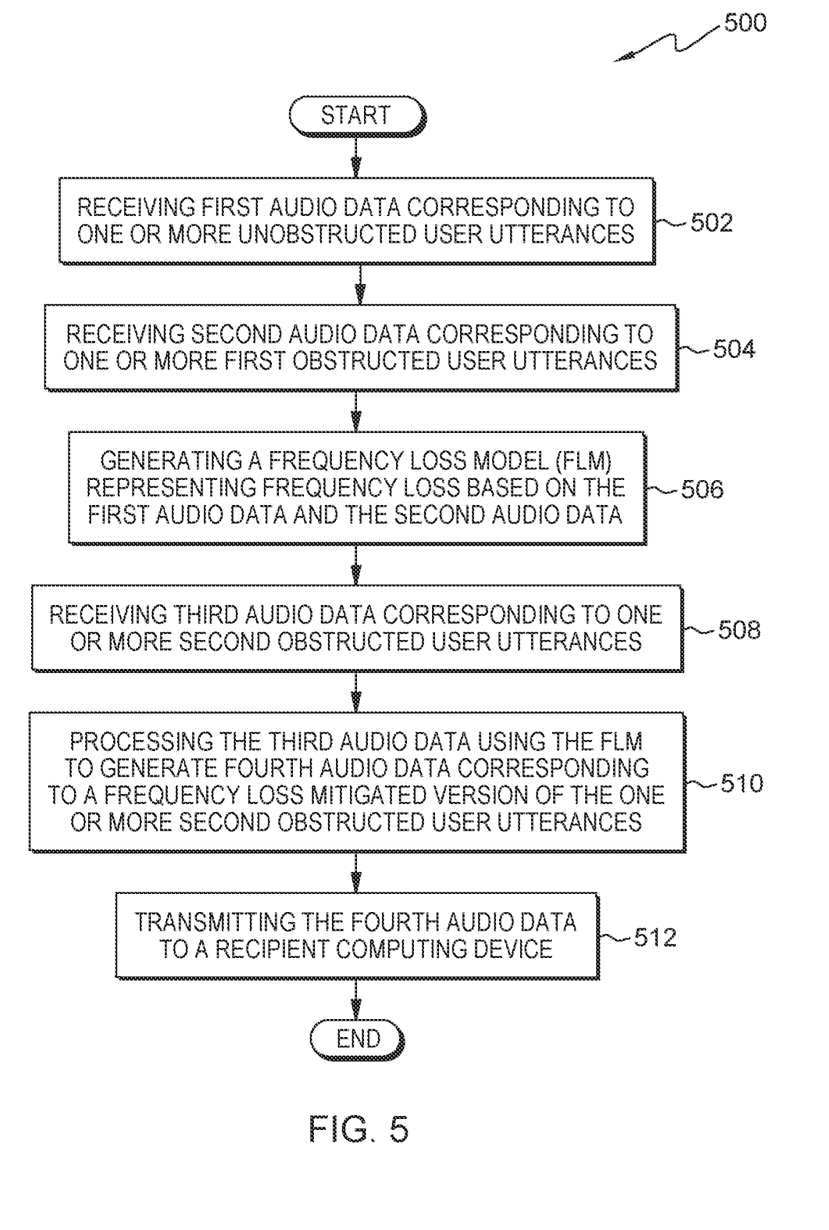
FIG. 5 is a flowchart depicting operational steps of a computer-implemented method for mitigating voice frequency loss, on a server computer within the distributed data processing environment of FIG. 1, in accordance with an embodiment of the present invention.

FIG. 5 is a flowchart depicting operational steps of a computer-implemented method 500 for mitigating voice frequency loss, on a server computer or a computing device within the distributed data processing environment of FIG. 1, in accordance with an embodiment of the present invention.

In an embodiment, computer-implemented method 500 for mitigating voice frequency loss may include one or more processors configured for receiving 502 first audio data corresponding to one or more unobstructed user utterances. For example, first audio data may be received at computing device 120 during a calibration phase to perform a voice analysis on the first audio data. During the calibration phase, the one or more processors may be configured to analyze voice frequencies generated by a user wearing a mask. The analyzed voice frequencies in the first audio data may be correlated to second audio data generated by the user not wearing a mask.

In an embodiment, computer-implemented method 500 may include one or more processors configured for receiving 504 second audio data corresponding to one or more first obstructed user utterances. In an embodiment, the one or more first obstructed user utterances may be obstructed by a facemask and one or more second obstructed user utterances may be obstructed by the facemask, wherein the facemask may include material characteristics corresponding to composition and frequency response. For example, the one or more first obstructed user utterances may correspond to user voice utterances generated by a user wearing a mask during a calibration phase. The one or more second user utterances may correspond to user voice utterances generated by the user not wearing a mask during the calibration phase.

In an embodiment, the first audio data and the second audio data may be captured via a microphone of a computing device, e.g. computing device 120 associated with the user that provided the first audio data to perform the calibration. The microphone may include a lapel microphone configured to attach to a lapel or clothing portion of a user associated with the computing device. The microphone may be embedded within an outer structure of the computing device or external to the computing device.

In an embodiment, computer-implemented method 500 may include one or more processors configured for generating 506 a FL model representing frequency loss between the first audio data and the second audio data. For example, the frequency loss may be based on a comparison between the first audio data and the second audio data and determining a difference between the frequencies represented therein. In an embodiment, generating 506 the FL model may further include one or more processors configured for converting the first audio data and the second audio data to frequency domains; determining frequency deltas for one or more of a range of frequencies in the frequency domains; determining attenuation values for one or more of the range of frequencies for the first audio data and the second audio data; and mapping the frequency deltas and the attenuation values in the frequency domains for the first audio data and the second audio data in a matrix representing the FL model.

In an embodiment, computer-implemented method 500 may include one or more processors configured for receiving 508 third audio data corresponding to one or more second obstructed user utterances. For example, one or more second obstructed user utterances may include user statements or natural language utterances, obstructed by the same or similarly composed facemask, detected by a microphone of a computing device after the FL model is generated. For example, the one or more second obstructed user utterances may be generated by a first user during a live web conference or a recorded session in which the first user is using computing device 120 to facilitate communications with a second user using recipient computing device 130.

In an embodiment, computer-implemented method 500 may include one or more processors configured for processing 510 the third audio data using the FLM to generate fourth audio data corresponding to a frequency loss mitigated version of the one or more second obstructed user utterances.

In an embodiment, computer-implemented method 500 may include one or more processors configured for transmitting 512 the fourth audio data to a recipient computing device. For example, recipient computing device 130 may configured for executing a web conference software program to communicate with computing device 120 using voice data, wherein computing device 120 may be associated with the user that produced the first audio data. In an embodiment, computing device 120 and recipient computing device 130 may be a wearable device configured to process and reproduce the fourth audio data as an audio signal via a speaker of the wearable device or via a speaker of recipient computing device 130.

In an embodiment, computer-implemented method 500 may further include one or more processors configured for generating a graphical display of FL model 140 on a user interface of a computing device, wherein the graphical display may include visualizations of time domain images (e.g., audio wave signals) and frequency domain images of one or more of the first audio data, second audio data, attenuation values, and frequency deltas. For example, the graphical display may be generated by a graphic equalizer configured to receive the audio data (e.g., unobstructed baseline user utterance, obstructed user utterance) and process the audio data to generate the FLM representing frequency loss based on audio characteristic differences between unobstructed audio data and obstructed audio data.

In an embodiment, the FLM may be executed as an audio plugin in a web conferencing program. For example, a general purpose FL model may be generated using a dataset with representative data for a large section of the population of users of web conferencing programs. The FLM may then be used to mitigate frequency losses in received obstructed audio data and generate output audio data corresponding to enhanced or boosted audio data that satisfies a similarity threshold between an unobstructed version of the received obstructed audio data. The generated output audio data may be transmitted to a recipient computing device that is engaged with and in communication with computing device via the web conferencing program.

Figure 6:
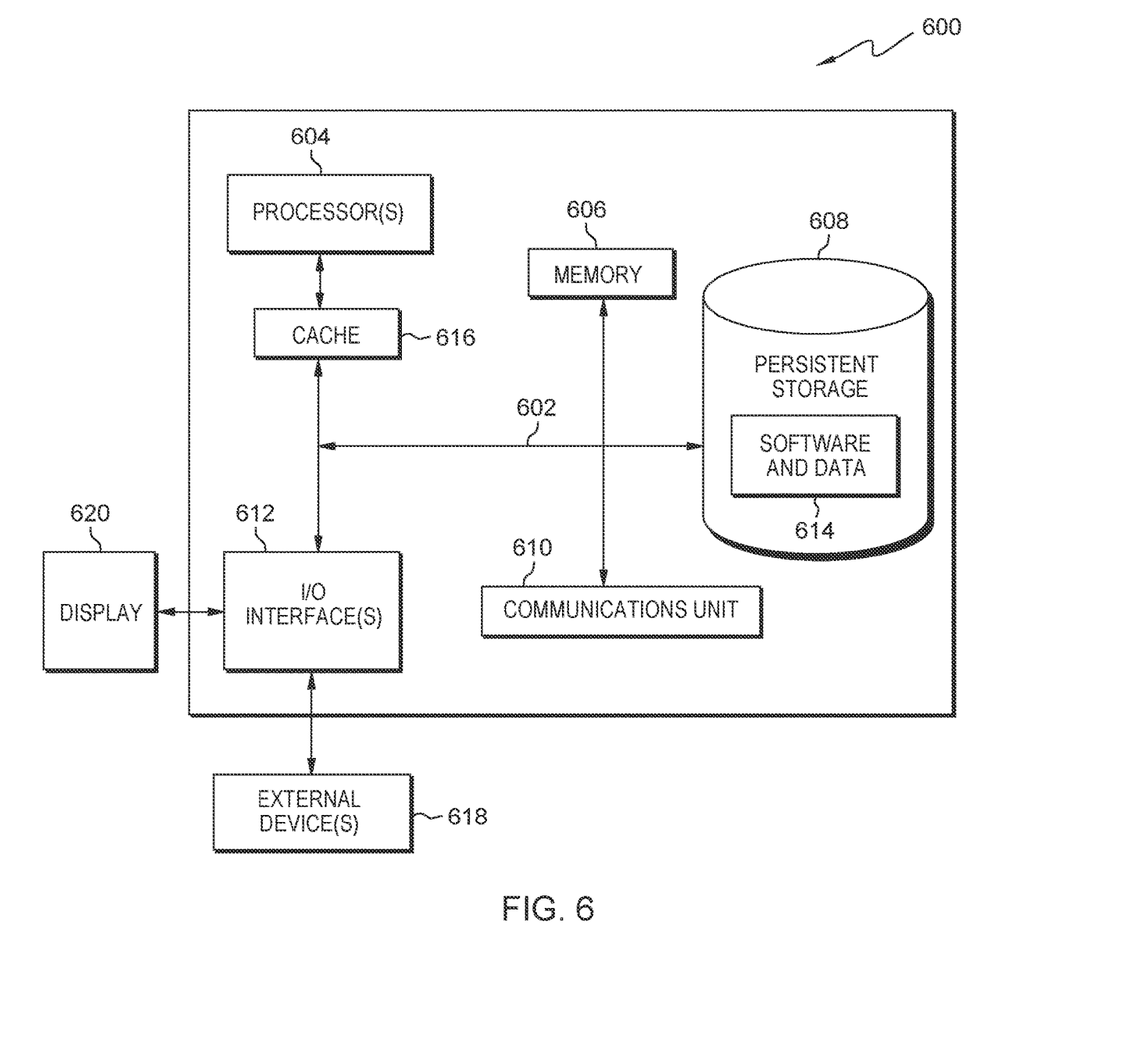
FIG. 6 depicts a block diagram of components of the server computer executing computer-implemented method for mitigating voice frequency loss within the distributed data processing environment of FIG. 1, in accordance with an embodiment of the present invention.

FIG. 6 depicts a block diagram of components of the server computer executing computer-implemented method for mitigating voice frequency loss within the distributed data processing environment of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

FIG. 6 depicts a block diagram of computing device 600 (shown in FIG. 1 as computing device 120) suitable for computing device 120 and recipient computing device 130, in accordance with an illustrative embodiment of the present invention.

Computing device 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 608 through communications unit 610.

I/O interface(s) 612 allows for input and output of data with other devices that may be connected to computing device 120 or recipient computing device 130. For example, I/O interface 612 may provide a connection to external devices 618 such as image sensor, a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

Software and data 614 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, first audio data corresponding to one or more unobstructed utterances of a user, wherein the received first audio data is associated with a received age of the user;
receiving, by one or more processors, second audio data corresponding to one or more first obstructed utterances of the user;
generating and storing, by one or more processors, a frequency loss model (FLM) for the user representing frequency loss between the first audio data and the second audio data at the received age of the user;
adjusting, by one or more processors, the stored FLM for the user based on changes to the user's age and stored measurements for a given age;
receiving, by one or more processors, third audio data corresponding to one or more second obstructed user utterances;
processing, by one or more processors, the third audio data using the tuned FLM to generate fourth audio data corresponding to a frequency loss mitigated version of the one or more second obstructed user utterances; and
transmitting, by one or more processors, the fourth audio data to a recipient computing device.

2. The computer-implemented method of claim 1, wherein the first audio data and the second audio data are captured via a microphone of a computing device.

3. The computer-implemented method of claim 1, wherein generating the FLM further comprises:
converting, by one or more processors, the first audio data and the second audio data to frequency domains;
determining, by one or more processors, frequency deltas for one or more of a range of frequencies in the frequency domains;
determining, by one or more processors, attenuation values for one or more of the range of frequencies for the first audio data and the second audio data; and
mapping, by one or more processors, the frequency deltas and the attenuation values in the frequency domains for the first audio data and the second audio data in a matrix representing the FLM.

4. The computer-implemented method of claim 3, further comprising:
generating, by one or more processors, a graphical display of the FLM on a user interface of a computing device, wherein the graphical display comprises visualizations of time domain images and frequency domain images of: the first audio data, the second audio data, the attenuation values, and the frequency deltas.

5. The computer-implemented method of claim 1, wherein the recipient computing device is a wearable device configured to process and reproduce the fourth audio data as an audio signal via a speaker of the wearable device.

6. The computer-implemented method of claim 1, wherein the FLM is executed as an audio plugin in a web conferencing program.

7. The computer-implemented method of claim 1, wherein generating the fourth audio data utilizes an adjustment selected from the group consisting of: bell-shaped equalizer response and Brickwall.

8. A computer program product comprising:
one or more computer readable storage media and program instructions collectively stored on the one or more computer readable storage media, the stored program instructions comprising:
program instructions to receive first audio data corresponding to one or more unobstructed utterances of a user, wherein the received first audio data is associated with a received age of the user;
program instructions to receive second audio data corresponding to one or more first obstructed utterances of the user;
program instructions to generate and store a frequency loss model (FLM) for the user representing frequency loss between the first audio data and the second audio data at the received age of the user;
program instructions to adjust the stored FLM for the user based on changes to the user's age and stored measurements for a given age;
program instructions to receive third audio data corresponding to one or more second obstructed user utterances;
program instructions to process the third audio data using the tuned FLM to generate fourth audio data corresponding to a frequency loss mitigated version of the one or more second obstructed user utterances; and
program instructions to transmit the fourth audio data to a recipient computing device.

9. The computer program product of claim 8, wherein the first audio data and the second audio data are captured via a microphone of a computing device.

10. The computer program product of claim 8, wherein generating the FLM further comprises:
program instructions to convert the first audio data and the second audio data to frequency domains;
program instructions to determine frequency deltas for each of a range of frequencies in the frequency domains;
program instructions to determine attenuation values for each of the range of frequencies for the first audio data and the second audio data; and
program instructions to map the frequency deltas and the attenuation values in the frequency domains for the first audio data and the second audio data in a matrix representing the FLM.

11. The computer program product of claim 10, further comprising:
program instructions to generate a graphical display of the FLM on a user interface of a computing device, wherein the graphical display comprises visualizations of time domain images and frequency domain images of: the first audio data, the second audio data, the attenuation values, and the frequency deltas.

12. The computer program product of claim 8, wherein the recipient computing device is a wearable device configured to process and reproduce the fourth audio data as an audio signal via a speaker of the wearable device.

13. The computer program product of claim 8, wherein the one or more first obstructed user utterances is obstructed by a facemask and the one or more second obstructed user utterances is obstructed by the facemask.

14. The computer program product of claim 8, wherein the FLM is executed as an audio plugin in a web conferencing program.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive first audio data corresponding to one or more unobstructed utterances of a user, wherein the received first audio data is associated with a received age of the user;
program instructions to receive second audio data corresponding to one or more first obstructed utterances of the user;
program instructions to generate and store a frequency loss model (FLM) for the user representing frequency loss between the first audio data and the second audio data at the received age of the user;
program instructions to adjust the stored FLM for the user based on changes to the user's age and stored measurements for a given age;
program instructions to receive third audio data corresponding to one or more second obstructed user utterances;
program instructions to process the third audio data using the tuned FLM to generate fourth audio data corresponding to a frequency loss mitigated version of the one or more second obstructed user utterances; and
program instructions to transmit the fourth audio data to a recipient computing device.

16. The computer system of claim 15, wherein the first audio data and the second audio data are captured via a microphone of a computing device, and the FL model is executed as an audio plugin in a web conferencing program.

17. The computer system of claim 15, wherein generating the FL model further comprises:
program instructions to convert the first audio data and the second audio data to frequency domains;
program instructions to determine frequency deltas for each of a range of frequencies in the frequency domains;
program instructions to determine attenuation values for each of the range of frequencies for the first audio data and the second audio data; and
program instructions to map the frequency deltas and the attenuation values in the frequency domains for the first audio data and the second audio data in a matrix representing the FL model.

18. The computer system of claim 17, further comprising:
program instructions to generate a graphical display of the FL model on a user interface of a computing device, wherein the graphical display comprises visualizations of time domain images and frequency domain images of: the first audio data, the second audio data, the attenuation values, and the frequency deltas.

19. The computer system of claim 15, wherein the recipient computing device is a wearable device configured to process and reproduce the fourth audio data as an audio signal via a speaker of the wearable device.

20. The computer system of claim 15, wherein the one or more first obstructed user utterances is obstructed by a facemask and the one or more second obstructed user utterances is obstructed by the facemask.

* * * * *